United States Patent
LaFollette et al.

(10) Patent No.: US 6,765,923 B1
(45) Date of Patent: Jul. 20, 2004

(54) EARLY ARBITRATION ON A FULL DUPLEX BUS

(75) Inventors: David W. LaFollette, Sunnyvale, CA (US); Jerrold V. Hauck, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 1108 days.

(21) Appl. No.: 09/416,497

(22) Filed: Oct. 12, 1999

Related U.S. Application Data

(63) Continuation of application No. 09/018,028, filed on Feb. 2, 1998, now Pat. No. 6,038,234.

(51) Int. Cl.⁷ .............................. H04B 7/212; H04J 3/02; G06F 13/36
(52) U.S. Cl. ....................... 370/443; 370/389; 370/437; 370/447; 370/462; 340/825.52
(58) Field of Search ................................. 370/389, 443, 370/449, 462, 447, 461, 347, 348, 450, 254–256, 408, 437, 438, 439, 346; 340/825.5, 825.08, 825.02

(56) References Cited

U.S. PATENT DOCUMENTS

| | | | | |
|---|---|---|---|---|
| 4,926,419 A | * | 5/1990 | Whipple | 370/447 |
| 5,027,342 A | * | 6/1991 | Boulton et al. | 340/825.02 |
| 5,142,682 A | * | 8/1992 | Lemay et al. | 340/825.5 |
| 5,276,887 A | * | 1/1994 | Haynie | 370/447 |
| 5,434,861 A | * | 7/1995 | Pritty et al. | 370/449 |
| 5,495,481 A | | 2/1996 | Duckwall | 370/462 |
| 5,629,685 A | * | 5/1997 | Allen et al. | 340/825.02 |
| 5,802,048 A | * | 9/1998 | Duckwall | 370/389 |

OTHER PUBLICATIONS

*P1394B Arbitration Acceleration;* Teener, Michael D. Johas, Firefly, Inc., 1997, Slides 1–9.

*P1394A Enhancements,* Jan. 3, 1997, pp. 1–48.

* cited by examiner

*Primary Examiner*—Afsar Qureshi
(74) *Attorney, Agent, or Firm*—Blakely, Sokoloff, Taylor & Zafman LLP

(57) ABSTRACT

A method and apparatus for early arbitration in a full duplex bus system. Early arbitration in a distributed arbitration serial bus system permits the resolution of requests for a next fairness interval during a current fairness interval such that the grant of the highest priority request in the next fairness interval may immediately follow a last packet of a last subaction in a current fairness interval. In this way, the bandwidth previously wasted propagating an arbitration reset token and waiting for arbitration requests can be substantially eliminated.

10 Claims, 7 Drawing Sheets

EARLY ARBITRATION ON A FULL DUPLEX BUS

This is a continuation of application Ser. No. 09/018,028 filed Feb. 2, 1998 now U.S. Pat. No. 6,038,234.

BACKGROUND OF THE INVENTION

(1) Field of the Invention

The invention relates to data transfer systems. More specifically the invention relates to arbitration on a full duplex bus.

(2) Related Art

For high speed data transfers over a distance, various high speed serial data transfer mechanisms have been developed. The IEEE Standard for a High Performance Serial Bus, IEEE Std. 1394-1995 published Aug. 30, 1996 (1394-1995 Standard) and its progeny provide a high speed serial protocol which permits implementation of high speed data transfers. The existing progeny includes P1394a Draft Standard for a High Performance Serial Bus (1394a Standard) and P1394b Draft Standard for a High Performance Serial Bus (1394b Standard). Generically, systems implementing 1394-1995, 1394a, 1394b or subsequent revisions and modifications thereof are referred to herein as 1394 systems.

In 1394 systems a plurality of nodes are organized into a tree topology. Additionally, all nodes are initially deemed peer to peer but on bus reset, one node assumes root status while the remaining nodes become branches and leaves of the topology. Both 1394-1995 and 1394a are half-duplex protocols. Thus, data may only flow in one direction at any given time. Both of these protocols employ a discrete arbitration phase during which all nodes seeking access to the bus send arbitration requests to the root node. The root node then resolves the arbitration and grants the bus to one of the arbitrating nodes. During this discrete arbitration phase no other useful work can be done on the bus. Desire to eliminate the discrete arbitration phase has spawned various embedded token approaches in which arbitration requests are embedded as tokens within the data packet itself.

The 1394b standard provides a full-duplex serial bus protocol. This has permitted a combination of embedded token and propagation of requests on the unused signal line to eliminate the discrete arbitration phase. Specifically, when the packet is being sent by a parent node, requests from the children nodes are free to propagate on the unused signal line going back to the parent node. If however, the packet is directed to a parent node the request must be embedded within the data stream. All requests are still handled by the sole root node which remains fixed after system initialization. Accordingly, token embedding will occur on nearly all transactions on at least some bus segments. Embedding tokens requires that the elasticity buffer of each PHY have extra capacity so as to allow insertion of the extra symbol into the data stream. The larger elasticity buffer increases the latency of repetition through each PHY and therefore increases latency of the overall bus system. Moreover, because arbitration tokens must frequently be embedded in the packet, there is a practical limit to the size and number of tokens that can be used for arbitration.

The 1394a standard defines a fairness interval as a time period delimited by arbitration reset gaps. Within a fairness interval, the total number of asynchronous packets that may be transmitted by a node is limited. The limit of each node may be explicitly established by the bus manager or may be implicit. Arbitration reset gaps are long periods of idle time with no arbitration request or bus traffic, which signal all nodes that they can enter a discrete arbitration phase of the next fairness interval. Thus, significant bus bandwidth is wasted in transitioning between fairness intervals. As used herein, fairness interval will refer to a period of time during which a node may transmit a limited number of asynchronous packets. Thus, any explicit requirement of a subaction gap to delimit the fairness interval has been eliminated as the term is used herein.

In view of the foregoing it would be desirable to be able to reduce the negative effects on bus bandwidth caused by fairness interval transitions.

BRIEF SUMMARY OF THE INVENTION

A system and method for performing early arbitration is disclosed. A state machine generates a best arbitration request for a current fairness interval a next fairness interval. The request is encoded with a priority identifying which of the current or next fairness interval the request corresponds. A transceiver is coupled to the state machine and a port.

DETAILED DESCRIPTION OF THE INVENTION

Early arbitration in a distributed arbitration serial bus system permits the resolution of requests for a next fairness interval during a current fairness interval such that the grant of the highest priority request in the next fairness interval may immediately follow a last packet of a last subaction in a current fairness interval. In this way, the bandwidth previously wasted propagating an arbitration reset token and waiting for arbitration requests can be substantially eliminated.

Figure 1:
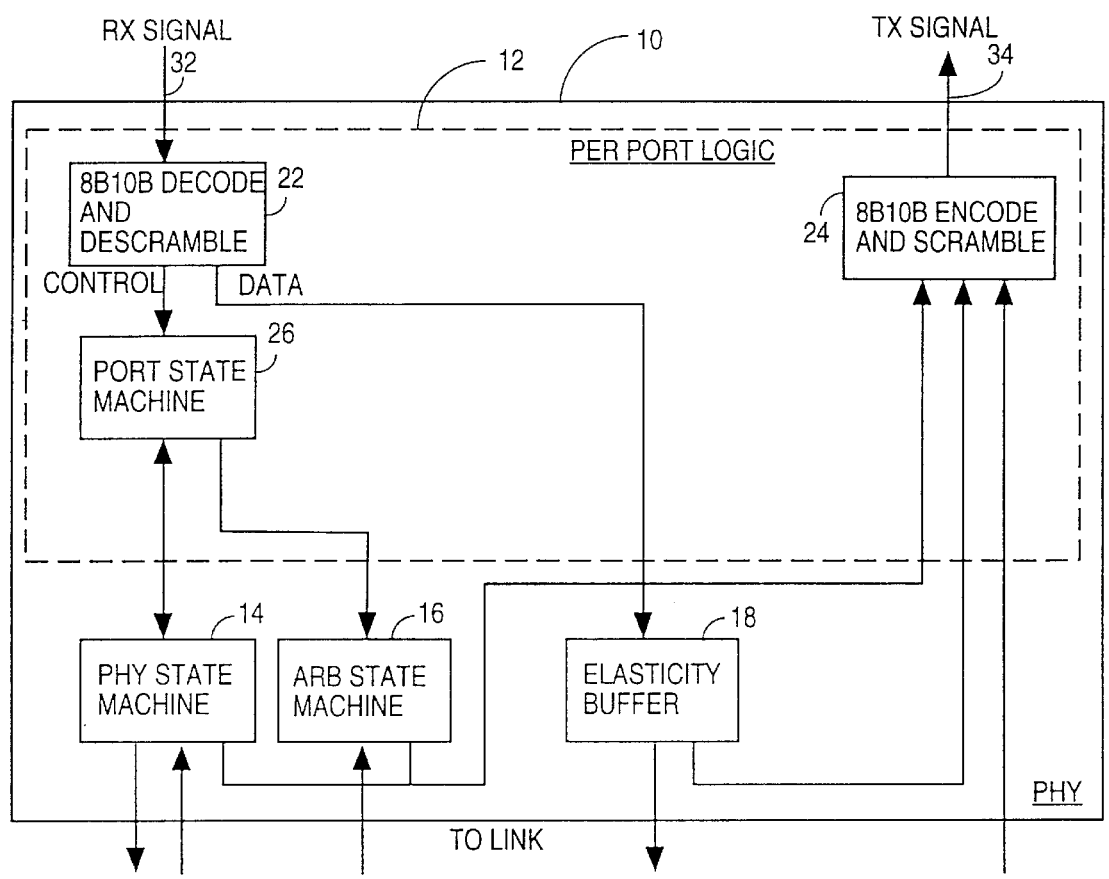
FIG. 1 is a block diagram of a physical layer of one embodiment of the invention.

Now referring to FIG. 1, a physical layer (PHY) 10 has one or more ports which can be connected to a serial bus not shown. For each such port, per port logic 12 is provided as part of the PHY 10. The PHY 10 receives a receive signal 32 and transmits a transmit signal 34 through each active port. Per port logic 12 includes a decoder 22 to decode and descramble the incoming receive signal 32. In one embodiment the decoder 22 is an 8B10B decoder and descrambler, which performs 8-bit 10-bit decoding. This means each 10-bit value coming in as the receive signal 32 is decoded into an 8-bit value. The decoder 22 is coupled to a port state machine 26 which receives a control value decoded by the decoder. Similarly, an encoder 24 is used to encode and scramble the outgoing transmit signal 34. In one embodiment of the invention the encoder performs 8B10B encoding. Analogous to the decode case, each byte of data to be transmitted is encoded as a 10-bit value. Thus, a number of codings exist that are not used for normal data encoding.

Additionally, the decoder 22 is coupled to an elasticity buffer 18. The elasticity buffer 18 buffers data decoded from the received signal 32 while that data is awaiting transfer to the link and/or repetition out on one or more ports of the PHY 10 as the transmit signal 34. The PHY state machine 14 and the arbitration state machine 16 may be combined as a single state machine or may be implemented as two separate state machines. The PHY state machine 14 provides the intelligence for the PHY including generation of any PHY generated packets. The arbitration state machine 16 assesses incoming arbitration information and provides outgoing arbitration requests. If the node is originating a packet on the bus it is the nominal root node. The nominal root node has complete arbitration state information for the topology. Based on this information the arbitration state machine 16 of the nominal root node grants the arbitration request of a highest priority branch. Since nominal root status passes with the grant of the bus, each node should be able to act as arbitrator for the topology. Copending application entitled "Distributed Arbitration on a Full Duplex Bus," Ser. No. 09/012,451, describes at least one suitable embodiment of a distributed arbitration system.

The PHY 10 in the nominal root node will receive arbitration requests from the remainder of the topology. Unlike in the prior art embedded token techniques, the reduced constraints on bandwidth use for arbitration permits nodes to make arbitration requests for a next fairness interval. Thus, for example, if a node is requesting access to the bus for a current fairness interval, it might mark its arbitration request as priority 1, while if arbitrating for a next fairness interval, it might mark the request as priority 0.

Figure 2:
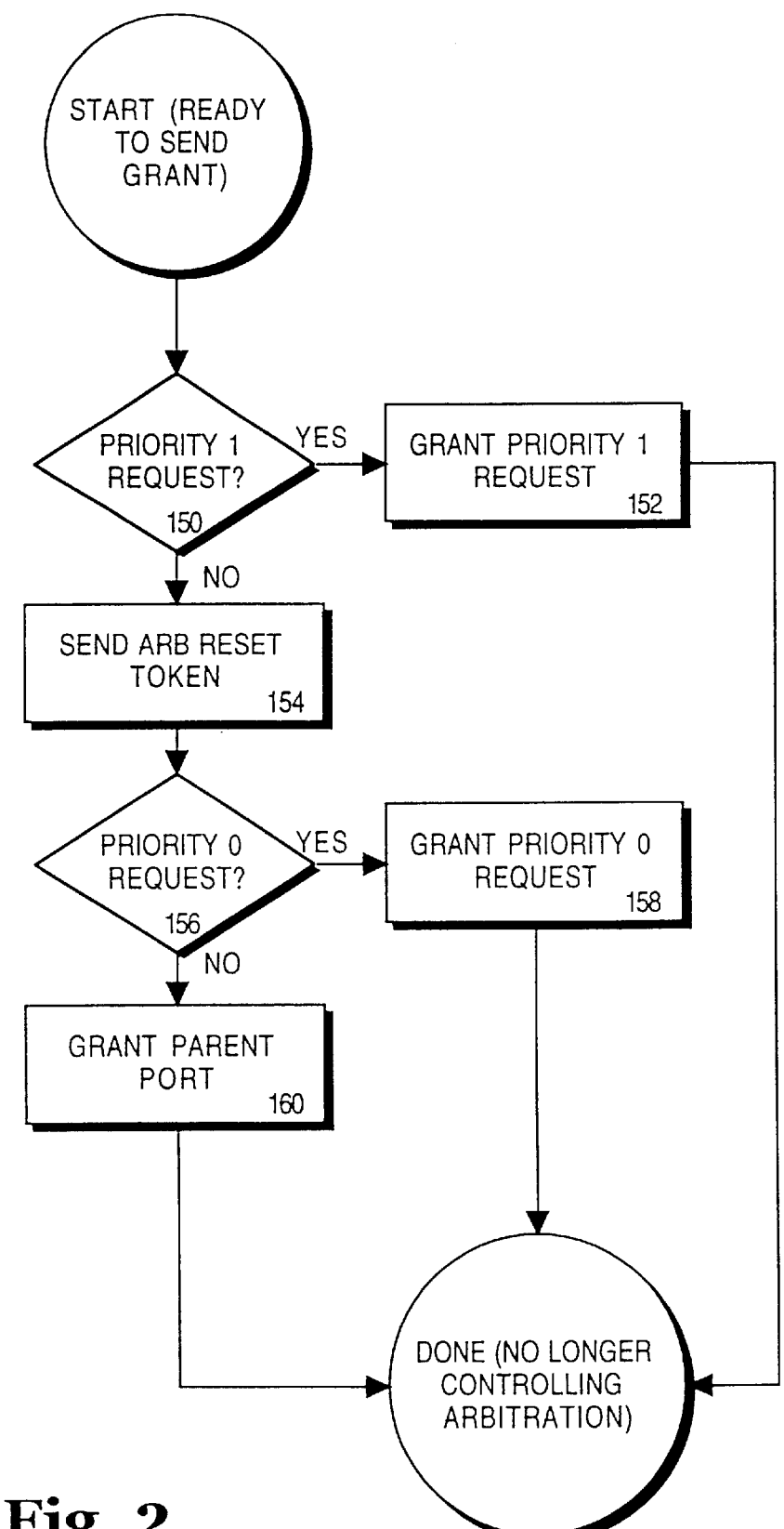
FIG. 2 is a flow chart of arbitration in a nominal root node of one embodiment of the invention.

Now referring to FIG. 2, as the nominal root gets ready to send a grant, it determines if any priority 1 requests are pending at decision block 150. If there are priority 1 requests pending, the highest priority request among these current fairness interval requests is granted at functional block 152. It is envisioned that arbitration requests might contain a priority bit field, including a plurality of bits. The most significant bit of the priority bit field might represent the fairness interval priority, e.g., 1 indicating the current fairness interval and 0 indicating the next fairness interval, and the remaining bits representing the priority within the corresponding fairness interval.

If no priority 1 requests are pending at decision block 150, the nominal root sends the arbitration reset token at functional block 154. This token propagates across the bus, causing a transition to the next fairness interval. Thus, the arbitration request previously indicated as priority 0 requests should be updated to priority 1 requests as they are now pending for the current fairness interval. A decision is made at decision block 156 whether any priority 0 requests are pending. If so, the highest priority request among the next fairness interval requests is granted at functional block 158. If not, the grant is sent to the physical parent port at functional block 160. Once the grant is sent, the former nominal root is no longer controlling arbitration and merely sends out arbitration requests across the bus. It is envisioned as within the scope and contemplation of the invention that the arbitration reset token and grant could be combined as a single token. Such as, for example, having one bit of the arbitration reset token indicate a grant if set. In such case, the sending of the arbitration reset token at functional block 154 would instead be subsumed as part of functional blocks 158 or 160. Notably, the grant indication would only be transmitted to a highest priority branch or the parent port, whereas the arbitration reset token should be sent to all branches.

Figure 3:
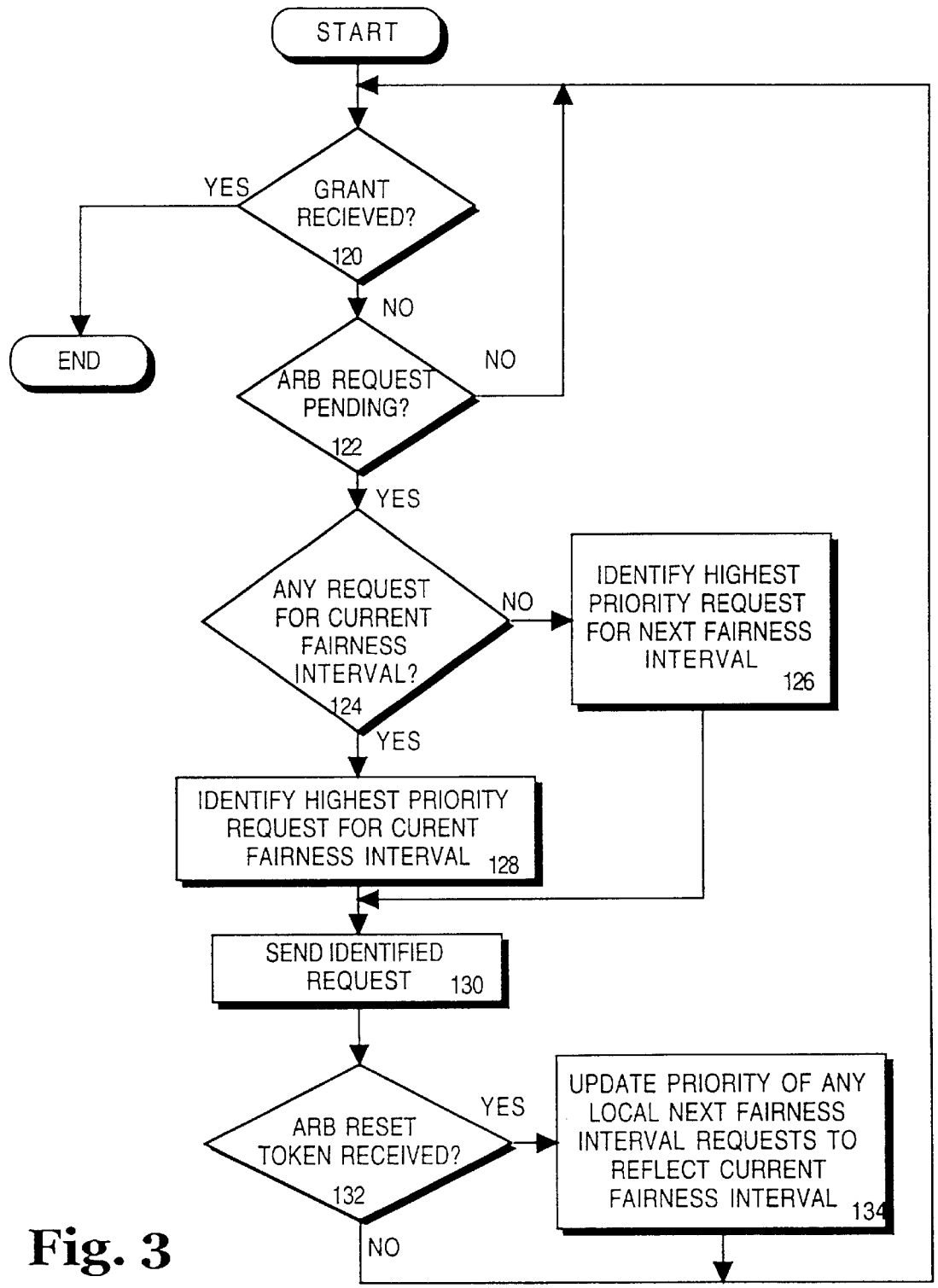
FIG. 3 is a flow chart of generation of arbitration requests in a node of one embodiment of the invention.

Now referring to FIG. 3, if a node is not the nominal root node, and a grant has not been received at decision block 120, a determination is made if arbitration requests are pending at decision block 122. Pending arbitration requests may come from any downstream node or the attached link. If no arbitration requests are pending, the node continues to watch for the grant or the arrival of arbitration requests. If the grant is received at decision block 120, the node becomes the nominal root and exits the flow of FIG. 3. If there are arbitration requests pending at decision block 122, the node identifies whether any requests are for the current fairness interval at decision block 124. If there are request for the current fairness interval, the node selects from among the requests for the current fairness interval the highest priority request at functional block 128. If there are no requests for the current fairness interval, the node identifies the highest priority request for the next fairness interval at functional block 126. In either case, the highest priority request identified is sent on the upstream port at functional block 130. A determination is then made at decision block 132 if the arbitration reset token has been received. If the arbitration reset token has been received, it is propagated to downstream nodes and the priority of any local next fairness interval request (i.e., a request originating at the node propogating the arbitration reset token) is updated to reflect the current fairness interval at functional block 134. A node does not update the priority of requests received from other nodes, the other nodes update the requests they send upon receiving the arbitration reset token. If the arbitration reset token has not been received or after any next fairness interval request is updated, the node returns to identify whether or not a grant has been received at decision block 120.

In one embodiment, rather than update other arbitration requests such that current fairness interval arbitration requests are always e.g., priority 1, the system toggles its interpretation of a request for the current fairness interval from e.g., one to zero. Thus, during a first fairness interval a request with a priority 1 is deemed highest priority, while in a second fairness interval a request with a priority 0 is deemed to be the highest priority. This approach has the advantage that it eliminates the need to update request priority, but it may in some cases cause a late arriving request for a previous fairness interval to be interpreted as a request for a next fairness interval.

Figure 4:
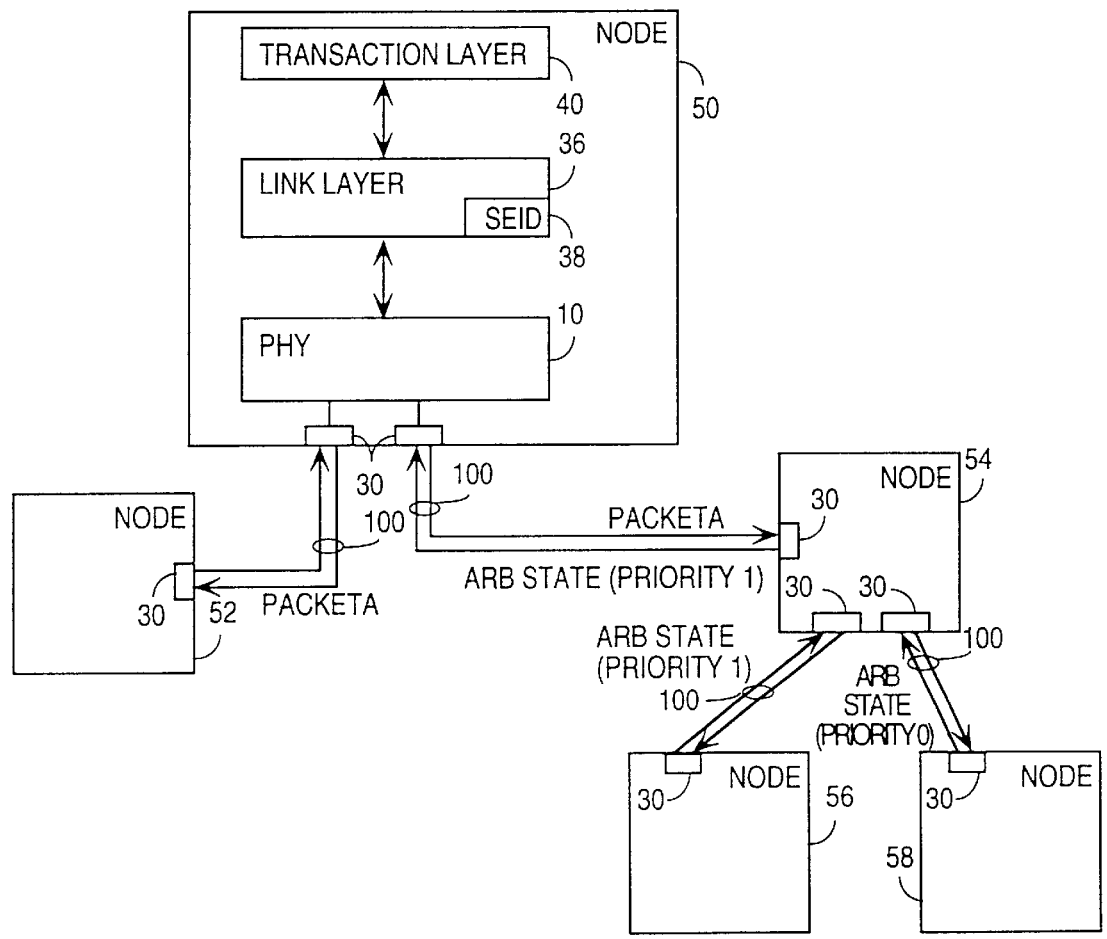
FIG. 4 is a block diagram of a tree topology of one embodiment of the invention at a first unit of time.

FIG. 4 shows a system that includes a plurality of nodes 50–58. The nodes 50–58 are organized in a tree topology. In this topology node 50 is the physical root node. However, employing the distributed arbitration technique, which node is the nominal root, nominal branches and nominal leaves depends on which node is permitted to originate a packet on the bus. The nodes are all interconnected by a full duplex serial bus 100. In one embodiment, serial bus 100 follows the 1394b protocol. Each node has one or more ports 30 through which communication between serial bus 100 and PHY 10 is conducted. The PHY 10 communicates with a link layer 36, which in turn communicates with a transaction layer 40. A link layer 36 includes a subaction end identifier (SEID) 38 to identify which link generated packets are last packets of subactions. The SEID 38 may communicate with the PHY state machine or directly with the encoder. As a result, the transmitter knows if the transmitted packet is a last packet of a subaction. This knowledge permits the transmitter to appropriately issue a GNT token.

In FIG. 4, node 50 is transmitting a last packet of a subaction (PACKETA) out both of its ports. Node 50 is therefore the nominal root node and receives arbitration information from each child node such that node 50 has the complete arbitration state of the topology available to it. In this case, node 54 is issuing a priority 1 arbitration request. Node 52 is not issuing any request, because it has nothing to transmit. Nodes 56 and 58 each send arbitration state information directly to node 54. Node 54 receives the arbitration requests from nodes 56 and 58. It resolves the priority of the arbitration requests and forwards the highest priority request (here the request of node 56) to the nominal root node 50. Once node 50 completes its transmission of PACKETA, it will handle the arbitration requests it has received. In this case, having received only the priority 1 request from node 54, a grant token will be sent down the branch to node 54. Once node 54 receives the grant, it must decide whether to keep it for itself or pass it on to node 56 or node 58. Here, because the attached link has been assumed not to be issuing any arbitration request, the grant token will be passed on to node 56 which is issuing the priority 1 request. The grant token will be immediately followed by the only remaining arbitration request in the topology, specifically, the priority 0 request being asserted by node 58.

Figure 5:
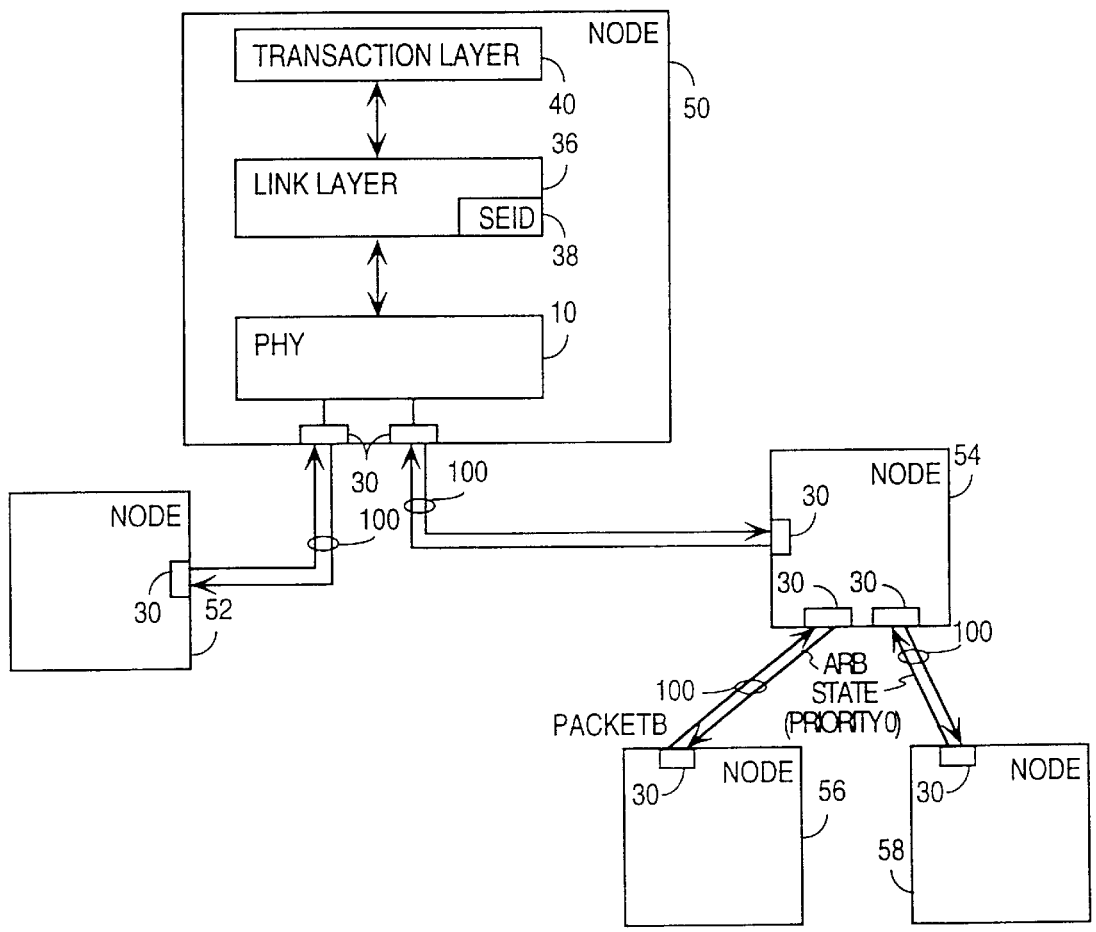
FIG. 5 is a block diagram of the tree topology of FIG. 4 at a subsequent unit of time.

Now referring to FIG. 5, FIG. 5 shows the topology at a unit in time when node 56 has received the grant and is, therefore, the nominal root. It transmits PACKETB to node 54 and receives the arbitration state priority 0 request forwarded by node 54 originating at node 58. Assuming that PACKETB is an end of subaction packet, since no priority 1 requests have been received, PACKETB will be followed by an arbitration reset token and a grant of the one priority 0 request. Thus, in the next unit of time, node 54 will receive the arbitration reset and grant. It will forward the arbitration reset token to node 50 and the arbitration reset token and grant to node 58. Node 58 will then begin transmission of its packet for the next fairness interval and the remaining nodes in the network may assert priority requests for the now current fairness interval (previously the next fairness interval) and the fairness interval immediately following.

Figure 6:
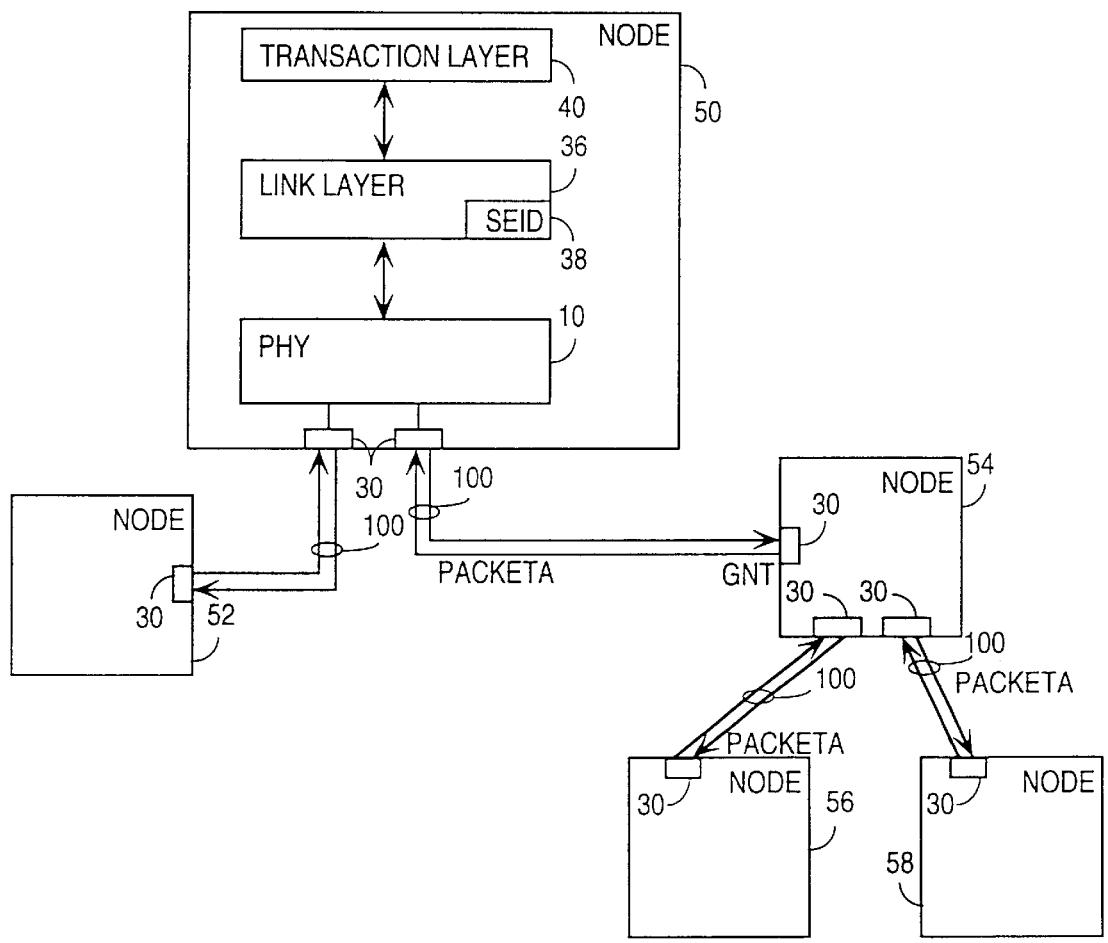
FIG. 6 is a block diagram of a tree topology of one embodiment of the invention during a unit of time when no arbitration requests are received by a nominal root.

Now referring to FIG. 6, FIG. 6 shows a unit in time where node 54 is nominal root and no arbitration requests are pending in the topology. Thus, node 54 transmits PACKETA on all of its ports and sends the grant following packet A on its physical parent port, e.g., towards node 50. Similarly, if node 50 were not the physical root, it would receive PACKETA and the GNT token and having no arbitration requests pending, would pass the GNT token on its parent port. Thus, the grant will ultimately arrive at the physical root if no arbitration requests are pending. Similarly, on bus reset, the physical root assumes initial nominal root status.

Figure 7:
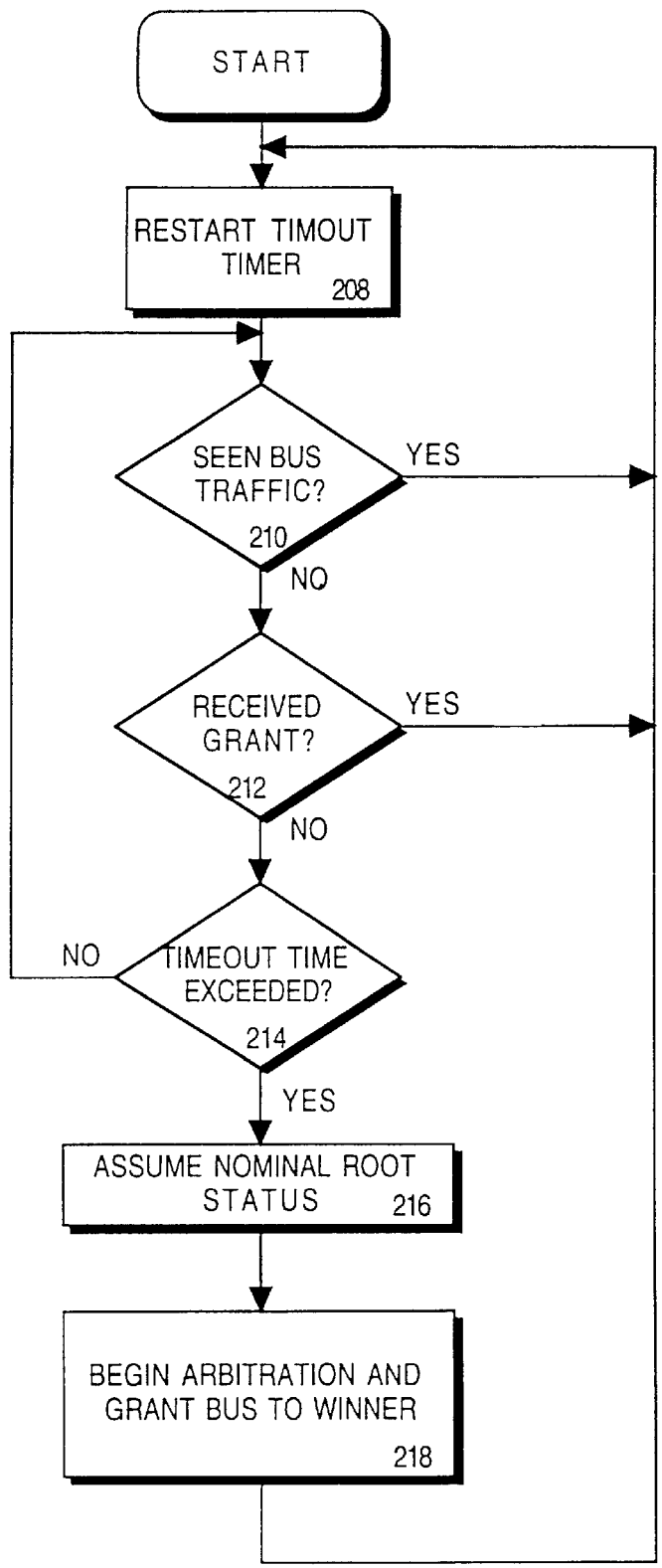
FIG. 7 is a flow chart of an error recovery procedure of a physical root node of one embodiment of the invention.

Now referring to FIG. 7, at functional block 208, a timeout counter is reset. Then, at decision block 210, the physical root determines if it has seen packet traffic on the bus. If it has, it resets the timeout counter at functional block 208 and continues to watch for additional bus traffic. If it does not, it checks to see if a grant has been received at decision block 212. If it has, it resets the count and continues to watch for bus traffic. If it has not, a decision is made whether a time-out time has been exceeded at decision block 214. If it has not, the physical root continues to watch for bus traffic but does not reset the count. If it has, the physical root assumes nominal root status at functional block 216, then begins arbitration and grants the bus to the winner at functional block 218. The winner becomes the nominal root.

In this manner, the physical root provides for error checking and avoids concerns relating to a corrupted grant token that leaves the bus in an indeterminate state. Since once a node sends the grant token, it loses nominal root status, if the grant token is corrupted (or lost), no new nominal root is established. Thus, existing arbitration requests remain unserviced. To recover from this condition, the physical root watches the bus and is provided with a time-out mechanism which permits it to declare itself the nominal root after a predetermined period of time.

By providing for arbitration requests for a next fairness interval to be sent during a current fairness interval, arbitration reset gaps can be reduced or eliminated. Specifically, if either only arbitration requests for a subsequent fairness interval or no arbitration requests are pending or received during a minimum fairness interval time, the nominal root can initiate a transition to a next fairness interval and if requests for the next fairness interval are pending can grant one of those requests substantially simultaneously without waiting for an arbitration reset gap. In one embodiment, a minimum fairness interval time is equal to a round trip propagation delay and arbitration response time.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. An apparatus comprising:

a state machine that generates a best arbitration request for a current fairness interval or a next fairness interval, wherein the request is encoded with a priority that identifies to which of the current fairness interval and the next fairness interval the requests corresponds;

a transceiver coupled to the state machine; and a port coupled to the transceiver.

2. The apparatus of claim 1 wherein the state machine updates the priority of the request for the next fairness interal responsive to an arbitration reset signal.

3. The apparatus of claim 1 wherein an arbitration request includes a priority field.

4. The apparatus of claim 1 wherein a most significant bit of the priority field corresponds to a fairness interval to which the request is directed.

5. A method comprising:

creating an arbitration request for a branch;

marking the request as a first priority if the request is for a current fairness interval; and marking the request with a second priority if the request is for a next fairness interval.

6. The method of claim 5 wherein the step of creating comprises the steps of:

receiving an arbitration request on at least one downstream port; and preparing a request for the branch to be transmitted on an upstream port.

7. The method of claim 6 wherein the step of preparing comprises the steps of:

assimilating all requests from downstream ports and any request from an attached link to identify a highest priority arbitration request for the branch; and selecting the highest priority request to be transmitted on the upstream port.

8. The method of claim 5 further comprising the step of:

updating a second priority request to be a first priority request in response to an arbritration reset token.

9. An apparatus comprising:

a node to be coupled into a tree topology of nodes by a bus, the node when having a right to transmit on the bus, being a nominal root node of the tree topology, and when the nominal root node, the node to receive arbitration requests for a current fairness interval and a next fairness interval from other nodes in the topology.

10. An apparatus comprising:

a circuit to generate a best arbitration request that is encoded with a priority that identifies whether the request is for a current fairness interval or a next fairness interval; and a transceiver coupled to the circuit.

* * * * *

UNITED STATES PATENT AND TRADEMARK OFFICE
CERTIFICATE OF CORRECTION

PATENT NO. : 6,765,923 B1
DATED : July 20, 2004
INVENTOR(S) : LaFollette et al.

It is certified that error appears in the above-identified patent and that said Letters Patent is hereby corrected as shown below:

Column 2,
Line 18, after the first occurrence of "interval", insert -- or --.

Signed and Sealed this

Ninth Day of May, 2006

JON W. DUDAS
*Director of the United States Patent and Trademark Office*